INVENTORS
PETER A PERONI
JOHN PAUL JONES, JR.

BY Laurence R. Brown
ATTORNEY

INVENTORS
PETER A PERONI
JOHN PAUL JONES, JR.

BY Laurence R. Brown
ATTORNEY

United States Patent Office 3,462,719
Patented Aug. 19, 1969

3,462,719

UNIVERSAL MODULAR PRINTED CIRCUIT MAGNETIC REED KEYBOARD SWITCH ASSEMBLY

Peter A. Peroni, 1080 Morris St., Pottstown, Pa. 19464, and John Paul Jones, Jr., 664 Valley View Lane, Wayne, Pa. 19087

Filed Oct. 26, 1967, Ser. No. 678,336
Int. Cl. H01h *9/02, 1/66*
U.S. Cl. 335—206 8 Claims

ABSTRACT OF THE DISCLOSURE

At least one glass tube enclosed magnetic reed switch is mounted on a planar printed circuit board which is removably inserted into a hollow housing member in grooves on either side of an axially movable planar key member with a magnet thereon actuating the switch contacts during a limited range of movement. This provides a universal mounting arrangement wherein one to four switches and other circuit elements may be located upon the printed circuit cards for operation by a single manually depressed key at one or more positions of its stroke. Each switch is standardized for predetermined operation timing during the magnet movement by selectively bending the leads and inserting into registration apertures in the printed circuit boards. The switch is thus precisely located within the magnetic field by simplified structure affording strain relief at closed ends of the glass tubes. The leads are bent normal to the reed switch axis for this purpose at calibrated positions to thereby precisely locate the magnetic switch gaps by means of punched hole pairs easily located to close tolerances in the printed circuit board.

This invention relates to keyboard switching apparatus and manufacturing methods. More particularly, it relates to switch mounting assemblies containing one or more glass enclosed magnetic reed switches operated by a magnet moved adjacent thereto.

This general type of keyboard switch together with attendant problems and features of operation is known in the art as may be seen from U.S. Patents 3,251,962, J. P. Jones, Jr., and 3,311,210, P. Peroni. However, certain problems and deficiencies exist in prior art switches of this type, particularly in view of demand for various complex configurations of switching contacts and conditions in electronic keyboard operated equipment such as computers and control systems. For example, it has been difficult in the prior art to operate uniformly in a single standardized mounting arrangement a plurality of as many as four switches which may be connected in completely isolated circuits to operate at similar or different timing under control of a single moving magnet. Also, interference problems can exist when a large number of switches are mounted close together on a keyboard so that they come near the magnetic fields of magnets moving in adjacent switches.

In addition, mounting and disassembly techniques are important, not only for ease of manufacture, and repair, but for reliability. Thus, the mounting of a tubular glass enclosed reed switch can provide stresses on the glass causing failure or abnormal contact resistance and bounce.

In switches of this class using moving magnets, care must be taken in precise location of the magnetic gaps in the reed switches relative to movement of the magnet, particularly if two separate reeds need be actuated substantially identically at the same time or at precisely spaced stroke intervals where the magnet position cannot be adjusted to compensate for differences in position.

Also, differences in spacing of the reeds from the axis of the magnet are important as well as the spacing of the switch gaps along the axis, and precise but inexpensive switch location means has not heretofore existed.

Thus, it is an object of this invention to produce an improved magnetically operated switch which can precisely and uniformly operate a plurality of isolated contacts.

It is a further object of the invention to provide magnetic switches and manufacturing methods for establishing uniformity of response from switch to switch when multiple switching sets are operated by a single magnet.

A still further object of the invention is to provide improved switch housing universal in nature for holding modular inserts for various semi-custom switch configurations.

Thus, there is provided by the disclosed embodiment of the invention a magnetic switch assembly including a substantially cubic hollow housing with three grooved slideways to accept and register in removable position two planar printed circuit boards and a movable magnet assembly within the housing. The printed circuit boards may be mounted symmetrically on both sides of the magnet assembly in grooves which precisely locate the circuit board positions. The board itself may have affixed thereto one or more magnetically operated reed switches which are actuated by the movement of a magnet held in an assembly positioned therebetween to slide in a further precisely located groove which defines the magnet axis and degree of movement. The reed switches enclosed in glass envelopes have their leads bent normally to their axis to precisely locate the position of the gap along the axial movement of the magnet. These are spaced in apertures punched in the printed circuit assembly within very close tolerances both with respect to spacing from the magnet and along its axial movement path. Furthermore, this provides a mounting with strain relief at the ends of the reed switch glass tubes, since extreme pressures or strains from temperature damages or shocks are absorbed in the elastic leads, which suspend the switch and eliminate any stiff mounts near the glass tube.

The preferred embodiment of the invention is described in more detail with reference to the accompanying drawings, wherein.

Figure 1:
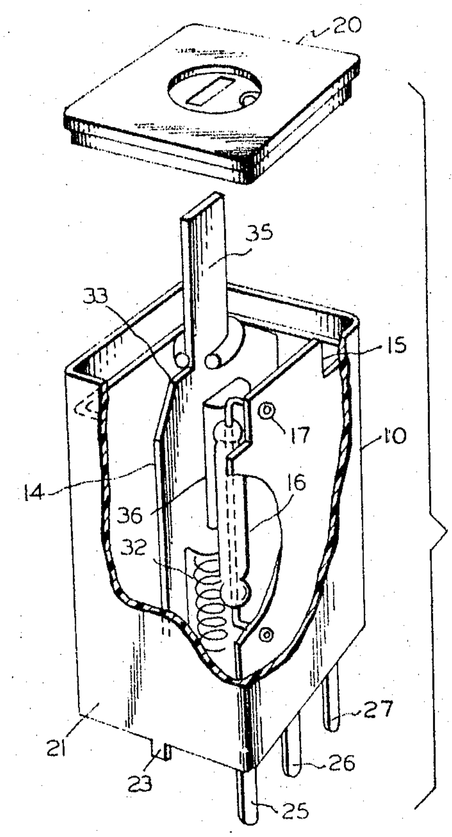
FIGURE 1 is a partially cut away perspective view of a keyboard switch and housing assembly embodiment provided by the invention.
Figure 3:
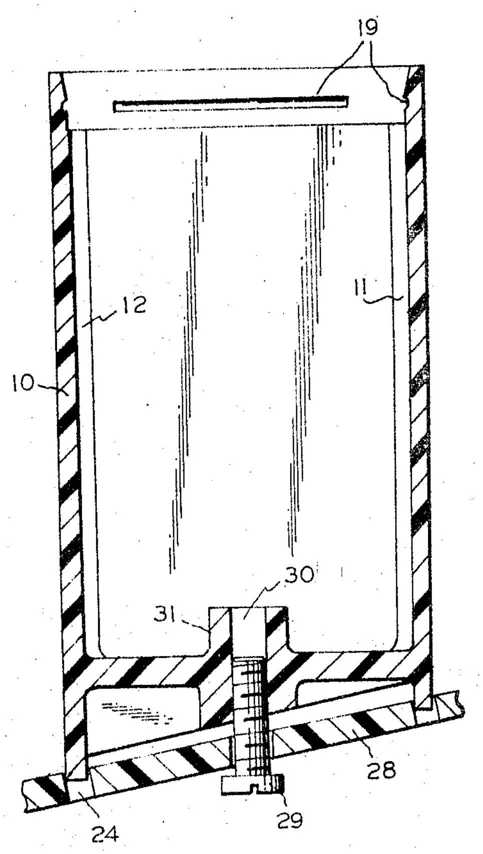
FIGURE 3 is a side view in section of the switch housing.
Figure 2:
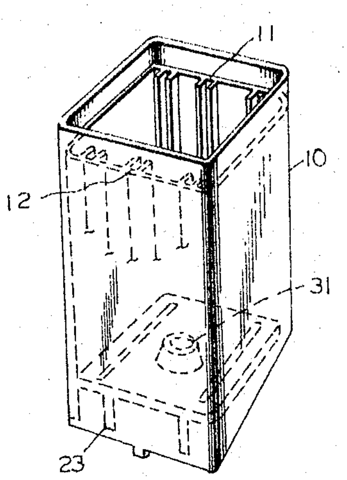
FIGURE 2 is a perspective view of the switch housing looking into the top opening.

As may be seen from FIGURES 1 to 3, a substantially cubic thin-walled hollow housing 10 is provided from a suitable plastic material. The housing 10 has on its internal walls a set of three pairs of grooves 11, 12, etc. for receiving a magnet holding key assembly 14 (seen in FIGURE 5) in the central groove pair sandwiched between two planar printed circuit cards 15 (seen in FIGURE 4). Each printed circuit card has mounted thereon one or more glass enclosed tubular magnetic reed switches 16 by means of registering bent leads extending axially from each end into precisely spaced apertures 17, 18, etc. in the printed circuit boards 15. A cap 20 is frictionally held in registering grooves 19 in the top opening of the housing to retain the printed circuit cards 17 and key assembly after insertion into grooves 11.

The bottom of the housing 10 is closed and stiffened with braces 21, and is slanted for mounting in a keyboard arrangement on a sloping laminated printed circuit wiring panel 22 with registration tab 23 locating the housing in aperture 24 of the panel 22. Apertures (not shown) in the panel register with the extending circuit connectors 25, 26, 27 extending from the switch mounting cards 15, so that they may be processed by dip soldering for example, to join to a wiring panel in the copper lamination 28 of panel 22. The switch housing 10 may be affixed in place by a screw 29 registering in aperture 30 coaxially centered within boss 31 at the bottom of the housing. An arrangement for mounting on the sloping panel as described in the hereinbefore mentioned Peroni patent may be used if desired. A coiled spring 32 seated about boss 31 engages the movable key assembly 15 to bias it upwardly with shoulder 33 resting against the cap 20. When the key cap 34, frictionally fit upon shaft 35 extending externally from the housing 20, is depressed against the bias of spring 32, the bottom prongs 35 of the key assembly 14 strike the bottom of housing 10 to limit the motion or keystroke over a predetermined range.

Figure 6:
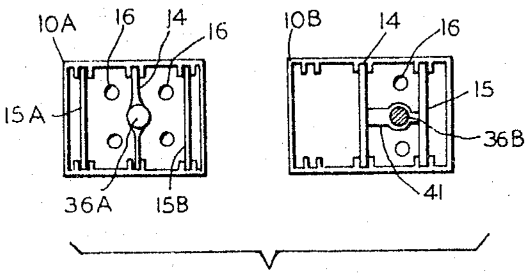
FIGURE 6 is a simplified top section view of two side-by-side switches as arranged in a keyboard.
Figure 5:
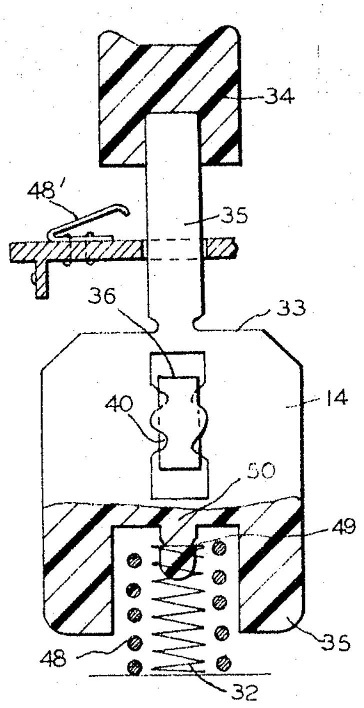
FIGURE 5 is a side view, partly in section, of a movable magnet keying assembly.

A magnet 36 is held centrally in the key assembly in a position which moves therewith to operate the contacts of the surrounding magnetic reed switches 16 somewhere in the range of motion of the keystroke. For purposes of precisely positioning the magnetic action of this stroke the magnet may be frictionally held for movement in the manner described in the hereinbefore mentioned Jones patent. For example, if the key assembly is made of plastic, it may have frictionally engaging tabs 40 holding magnet 36 but permitting longitudinal movement under force of a calibration instrument as shown in FIGURE 5. If the key assembly (as shown in FIGURE 6) is made of ferrous shielding material, then a brass clip 41 may be affixed thereto for retaining magnet 36B in a frictionally held longitudinally movable position. If only one switch card 15 is included, this mounting may be desirable since a shield is introduced to prevent interaction of the magnet with switches in an adjacent keyboard switch assembly when switches are mounted closely together. Otherwise, the central positioning of the magnet 36A puts it in the most remote position and is desirable because four switches 16 on circuit cards 15A and 15B can be symmetrically arranged for identical switching characteristics under the influence of movable magnet 36A.

Figure 4A:
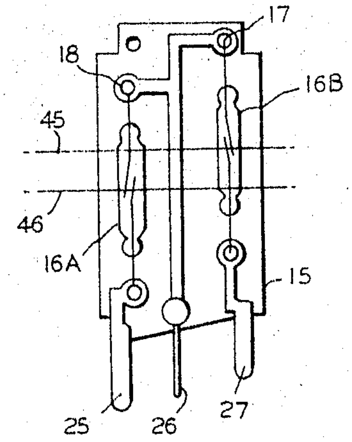
FIGURE 4A is a plan view of a removable modular printed circuit switch array provided by the invention and FIGURE 4B is a variation.
Figure 4B:
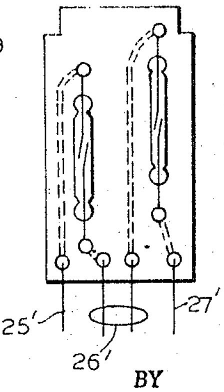

As shown in FIGURE 4, switching, phasing, time or position in the switch elements 16A and 16B may be chosen for make-before-make sort of switching requirements, simply by staggering the mounting of the switches in different mounting holes, 17 and 18, for example. Thus, the overlapping reeds of the switches are at two different levels 45, 46 and the magnet operates them at different positions along its movable stroke. Wiring patterns are shown on both FIGURES 4A and 4B to show wiring variations and terminals of either printed circuit type 25, 26, 27 or of extending wire type 25', 26', 27'.

This switching feature can be coupled with a second heavier coil spring 48 or equivalent leaf spring 48' as shown in FIGURE 5, which is engaged after a part of the key stroke to give a manual feel and provide a double-action key where increased key pressure can provide a second function in a completely isolated switching circuit after the first circuit is switched. For ready assembly of spring 32 inside the housing 10 to slip over boss 31, it may be frictionally retained on a groove 49 in tab 50 before assembly.

In this improved switch arrangement where it is desirable to operate a plurality of switches from a single magnet to provide complex switching functions in isolated circuits, it is sometimes necessary to operate the switches at close phasing. For example, it is desirable on a typewriter keyboard to have all keys operated at the same stroke depth. Also, some electronic circuits may require substantially identical timing of the switch closures in two or more reed switch assemblies 16. As may be visualized in FIGURE 6, part of this problem is related to the spacing of the magnet from the switches, and the concentric arrangement of symmetrically positioned switches around centrally located magnet 36A permits standardization of switch operation position within a small degree of error. In this respect accuracy of switching is possible with the precise location of apertures 17, 18, etc. in switch mounting board 15 when the procedure described in connection with FIGURE 7 is followed. In the described switches, magnetic reeds are sealed within a tubular glass envelope and the leads 55 and 56 axially extend therefrom. A visual inspection readily shows the nominal location of the overlap section 54 which can be gauged for positioning in a jig at marks 59. Then by use of simple fixed anvil 57 and movable brake 58 over a reciprocal motion cycle indicated at 60, the leads are bent into positions 55A and 56A. Thus, the switches are calibrated for the predetermined switching timing, location or sequence by selection of the desired standard lead configurations and matching holes 17, 18 to provide a whole series of modules for diverse switching requirements.

Note that stresses at the glass seals are not great when mounted in printed circuit cards 15 as compared with the holding of a switch in position in a switch by means of one lead extending through the bottom of the switch housing. Also note that the bending configuration of FIGURE 7 provides for lead bending without stress at the glass to metal seal where the leads leave the tube, when clamps 62 hold the leads tight before anvil 58 is moved.

Figure 7A:
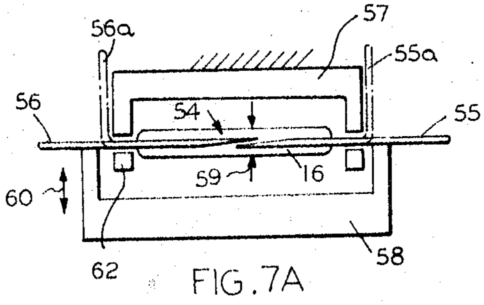
FIGURE 7A is a sketch illustrating the standardization procedure for locating switches in the key switch assembly of the invention with FIGURE 7B showing a variation.
Figure 7B:
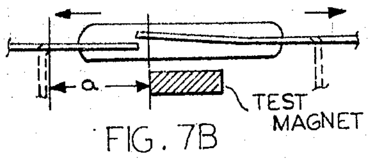

As shown in FIGURE 7A, the leads are preferably bent in relation to a fixed test magnet which provides for closure of the contacts when positioned a variable distance a from one anvil. This permits individual switch assemblies offering different characteristics to be made uniform with respect to movement of magnets along the switch axis.

It is clear therefore that the present invention provides a modular keyboard switch housing offered improved and advantageous features. Thus, a large range of custom switching configurations may be assembled with standard modules, and the printed circuit mounting arrangement further increases life and reliability of the switches. Having therefore disclosed a novel multiple purpose universal switch assembly wherein a single movable magnet may precisely operate a multiplicity of surrounding switches, those features of novelty believed descriptive of the spirit and nature of the invention are defined with particularity in the appended claims.

What is claimed is:

1. A modular switch assembly comprising substantially hollow housing member, two switch members and means registering them within said housing member for a limited range of relative movement therebetween, one of said switch members containing a magnet and the other containing at least one magnetically operated switch positioned to switch under the influence of said relative movement with said magnet, said switch members having in common with the housing member keyed registration means for removably positioning the switch members in predetermined fixed position inside said hollow housing member and the switch member with the magnet has means extending outside said housing to move it.

2. A switch as defined in claim 1, wherein both said switch members are substantially planar plates with the magnet and switch members protruding therefrom at positions inside the housing member.

3. A switch as defined in claim 2, wherein the switch member has at least two magnetically operable switches mounted thereon for operation by movement of said magnet over said range.

4. A switch as defined in claim 3, wherein the switches are positioned to operate at different positions of the movable member within said range.

5. A switch as defined in claim 2, wherein planar switch-bearing members including at least one switch with magnetically operated contacts are located symmetrically on two sides of the member bearing the magnet in positions causing the magnet upon movement through the range to operate the switch contacts on both sides.

6. A switch as defined in claim 2, wherein the planar member carrying the magnet is of ferromagnetic material and the magnet is held on the side thereof adjacent the plate holding the switch members.

7. A switch as defined in claim 2, wherein the housing is a substantially cubical thin-walled plastic member with an open end for inserting the planar members and internal grooves for registering them.

8. A switch as defined in claim 2, wherein the planar member holding the switch is a printed circuit board having apertures drilled therein at predetermined positions for locating the switch contacts, and the switch comprises a glass enclosed magnetic reed switch with leads extending from a contact position at which reeds in the enclosure overlap and passing through opposite ends of the enclosure and bent at positions gauged at predetermined distances from the overlap.

References Cited

UNITED STATES PATENTS

| | | | |
|---|---|---|---|
| 3,233,061 | 2/1966 | Jones | 335—153 |
| 3,253,338 | 5/1966 | Burnette | 335—153 X |
| 3,259,806 | 7/1966 | Reed. | |

BERNARD A. GILHEANY, Primary Examiner

R. N. ENVALL, Jr., Assistant Examiner